United States Patent
Dienhart et al.

(10) Patent No.: US 6,216,477 B1
(45) Date of Patent: Apr. 17, 2001

(54) REGULATING DEVICE FOR AIR CONDITIONER REFRIGERANT CIRCUIT

(75) Inventors: Bernd Dienhart, Cologne; Hans-Joachim Krauss, Stuttgart; Michael Katzenberger, Brackenheim; Karl Lochmahr, Vaihingen, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/413,547

(22) Filed: Oct. 6, 1999

(30) Foreign Application Priority Data

Oct. 6, 1998 (DE) .............................. 198 46 026

(51) Int. Cl.$^7$ ................................. F25B 41/104
(52) U.S. Cl. ............................ 62/217; 62/203; 62/204; 62/208; 62/210; 62/223; 62/224
(58) Field of Search ............................ 62/203, 204, 206, 62/208, 210, 217, 222, 223, 224

(56) References Cited

U.S. PATENT DOCUMENTS

| | | | |
|---|---|---|---|
| 4,495,779 | * | 1/1985 | Tanaka et al. .......................... 62/211 |
| 5,224,354 | * | 7/1993 | Ito et al. ................................ 62/210 |
| 5,551,248 | * | 9/1996 | Derosier ................................ 62/155 |
| 5,867,998 | * | 2/1999 | Guertin ................................ 62/225 |
| 6,018,958 | * | 2/2000 | Lingelbach et al. .................. 62/222 |

FOREIGN PATENT DOCUMENTS 37 06 152   9/1988 (DE) .

OTHER PUBLICATIONS

German Search Report.
German Article entitled "Kleines Handbuch Technischer Regelvorgänge" by Winfried Oppelt, Verlag Chemie GmbH Weinheim/Bergstr., 1964, pp. 481–484.
German Article entitled "Kohlendioxid als Kältemittel für Pkw–Klimaanlagen" ("Carbon Dioxide as Refrigerant for Automobile Air Conditioners"), Ki Luft und Kältetechnik, No. 1, 1998, pp. 19–24.

* cited by examiner

Primary Examiner—Corrine McDermott
Assistant Examiner—Marc Norman
(74) Attorney, Agent, or Firm—Evenson, McKeown, Edwards & Lenahan, P.L.L.C.

(57) ABSTRACT

A control device is provided for a refrigerant circuit of an air conditioner, divided by a compressor and a vent element into a high-pressure side and a low-pressure side. The control device includes a high-pressure-side control part and a low-pressure-side control part for controlling one or more controllable high-pressure-side or low-pressure-side system components. The two control parts are coupled with one another, with at least one influential parameter of one control part forming a coupling parameter that is coupled into the other control part as an influential parameter that is effective there as well. The control device is useful for carbon dioxide air conditioners of motor vehicles.

5 Claims, 3 Drawing Sheets

ABSTRACT
REGULATING DEVICE FOR AIR CONDITIONER REFRIGERANT CIRCUIT

BACKGROUND AND SUMMARY OF THE INVENTION

This application claims the priority of German Application No. 198 46 026.0, filed Oct. 6, 1998, the disclosure of which is expressly incorporated by reference herein.

The invention relates to a regulating device for a refrigerant circuit of an air conditioner, especially a vehicle air conditioner, with the refrigerant circuit being divided by a compressor and a vent element into a high-pressure side and a low-pressure side. A control part on the high-pressure side controls one or more high-pressure-side air conditioning components that can be controlled. A low-pressure-side control part controls one or more low-pressure-side air conditioner components that can be controlled.

The refrigerant circuit of an air conditioner, as used especially in motor vehicles, is usually divided into a high-pressure side and a low-pressure side by a compressor and a vent element, such as a controllable expansion valve or single or multistage fixed throttle. In the refrigerant flow direction, the high-pressure side begins on the compressor outlet side and extends up to the inlet side of the expansion element. The low-pressure side begins on the outlet side of the expansion element and extends up to the intake, in other words the input side of the compressor. On the high-pressure side and on the low-pressure side, there are one or more air conditioner components that can be controlled. For example, the compressor and the expansion valve can be controlled, as well as air flow control devices, such as a fan and/or air flaps associated with a condenser on the high-pressure side and/or an evaporator on the low-pressure side.

Recently, the use of refrigerant R 744, in other words carbon dioxide, instead of the conventional refrigerants R 134a and R 12 has been considered even for motor vehicle air conditioners; see the article by H. Gentner and A. Földi, "Carbon Dioxide as Refrigerant for Automobile Air Conditioners" in Ki Luft und Kaltetechnik, No. 1, 1998, p. 19. The cooling unit connected downstream of the compressor is referred to in these carbon dioxide systems not as a condenser, as in the case of the conventional refrigerants mentioned above, but as a gas cooler. This is because the low critical temperature of CO2 means that it frequently operates in the supercritical range and therefore causes no condensation. Because of the frequently supercritical operation and the high operating pressures that develop, special requirements apply to carbon dioxide air conditioners, including their control.

Within the scope of a European "project" RACE referred to in the article cited above, a regulating device was proposed for a CO2 refrigerant circuit that incorporates a high-pressure-side control part and a low-pressure-side control part independent thereof. The regulating part on the high-pressure side has a regulating circuit for controlling an expansion valve at a high-pressure setpoint, which is set using the coefficient of performance control, with the term "coefficient of performance" (abbreviated COP) referring to the ratio of the cooling power to the effective driving power of the system. COP regulation determines the high-pressure setpoint as a function of the air temperature on the air-inlet side of the gas cooler. The regulating part on the low-pressure side incorporates a control circuit for regulating the compressor to a specific intake pressure setpoint. An evaporator temperature regulating circuit is superimposed on this compressor intake pressure control circuit and adjusts the intake pressure setpoint as a function of the control deviation of the evaporator temperature.

The technical problem solved by the invention is the provision of a refrigerant circuit control device of the type recited at the outset with which air conditioners, especially those with a controllable compressor and possibly also a controllable expansion valve (and especially also CO2 air conditioners), can be regulated at relatively low control-technology expense, saving energy and functioning comparatively precisely and stably with high efficiency.

The invention solves this problem by providing a control device for a refrigerant circuit of an air conditioner, especially a vehicle air conditioner, with the refrigerant circuit being divided by a compressor and a vent element into a high-pressure side and a low-pressure side. A control part on the high-pressure side controls one or more high-pressure-side air conditioning components that can be controlled. A low-pressure-side control part controls one or more low-pressure-side air conditioner components that can be controlled. The two control parts are coupled with one another, with at least one influential parameter of the one control part forming a coupling parameter that is coupled into the other control part (to form an influential parameter there as well).

In this control device according to the invention, the high-pressure-side and low-pressure-side controlling parts are coupled together because at least one influential parameter of one regulating part forms a coupling parameter that is coupled into the other control part as an influential parameter that is operative there as well. The term "influential parameter" refers to all those physical parameters that influence the controlling behavior of the regulating section in question, in other words which are set by the control components or are supplied to the latter. For the sake of simplicity, in this context the term "control" will also be understood to include pure control interventions, i.e., interventions without feedback. Due to the coupling of the two regulating parts, they can operate adjusted to one another, so that a desired control behavior of the air conditioner can be achieved reliably and with a stable control behavior, for example the achievement of a desired evaporator temperature. It turns out that CO2 air conditioners in particular can also be regulated satisfactorily in this manner, so that energy-saving operation is possible especially also in the low power range with a suitable system design, so that a comparatively high total efficiency is achieved.

In an advantageous control device according to the invention, a low-pressure-side influential parameter forms a regulating variable for a low-pressure-side compressor intake pressure regulator or a low-pressure-side evaporator temperature regulator and serves as a coupling parameter coupled into the control part on the high-pressure side.

In a further advantageous control device according to the invention, the influential parameter is a low-pressure side influential parameter coupled to the high-pressure-side control part and serves on the high-pressure side as an influential parameter to adjust the setpoint for a high-pressure regulator and/or to adjust the power of a fan for a cooling unit connected downstream of the compressor, such as a condenser or gas cooler.

Other objects, advantages and novel features of the present invention will become apparent from the following detailed description of the invention when considered in conjunction with the accompanying drawings.

DETAILED DESCRIPTION OF THE DRAWINGS

Figure 1:
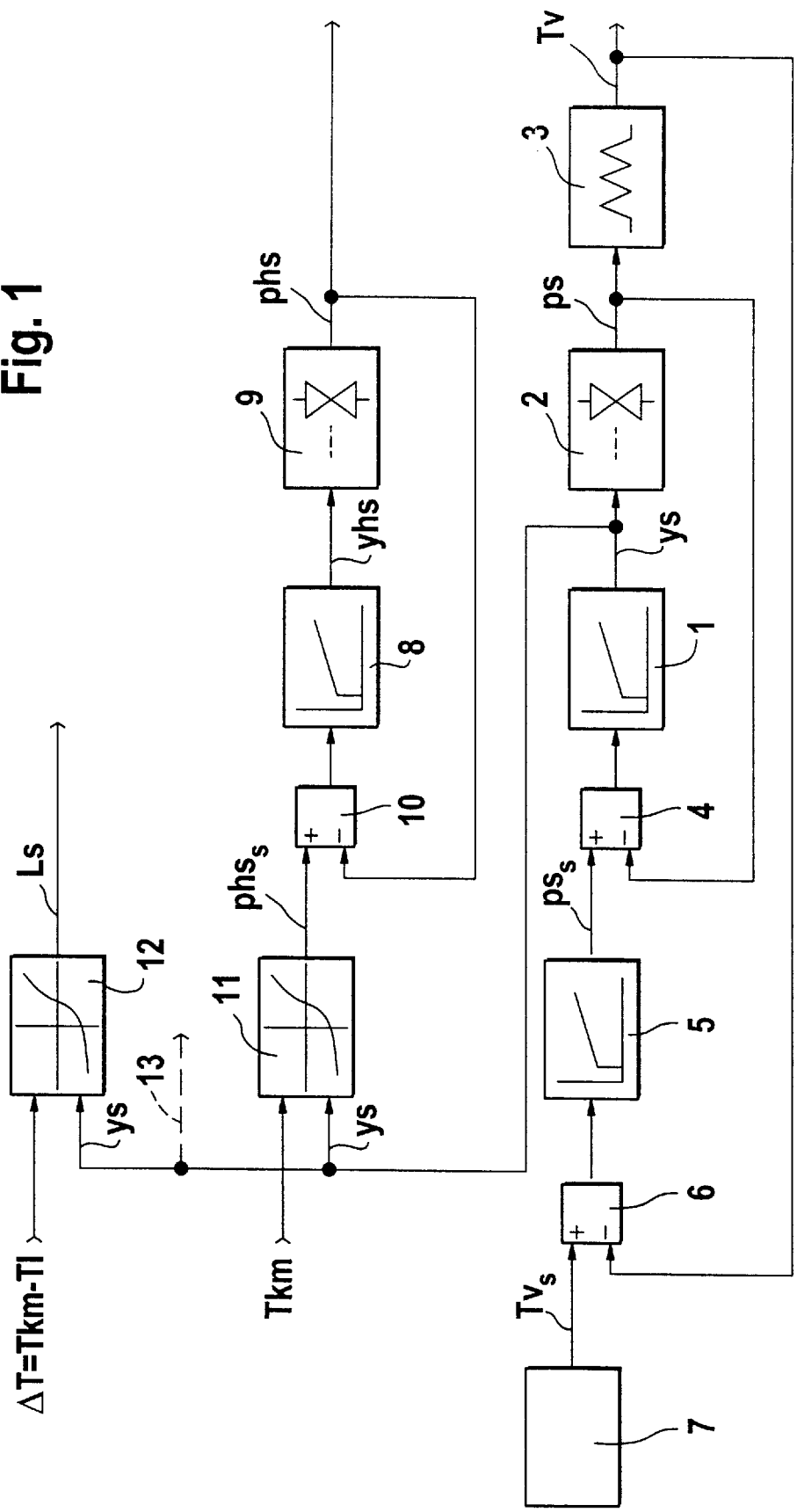
FIG. 1 is a block diagram of a control device for a refrigerant circuit with a high-pressure control circuit and low-pressure, superimposed intake pressure and evaporator temperature control circuits as well as a coupling of the high-pressure control circuit and a cooling unit fan control to an intake pressure actuating signal.
Figure 2:
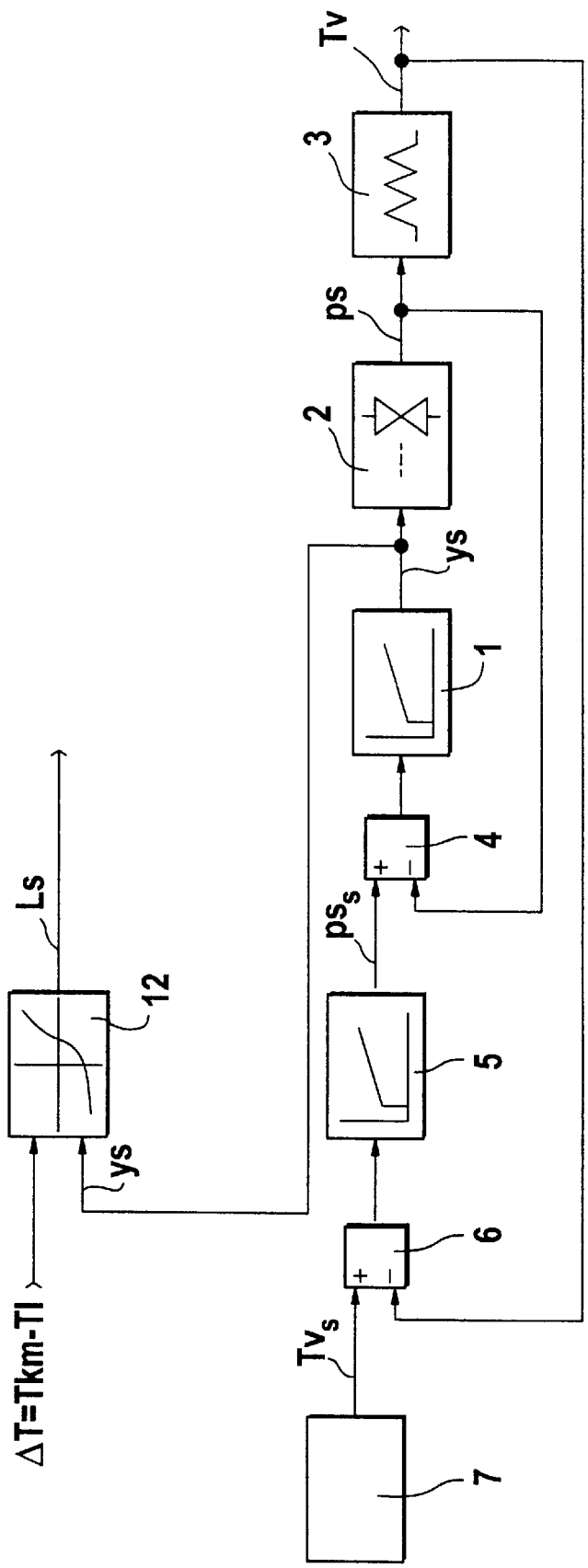
FIG. 2 is a block diagram of a control device according to FIG. 1, but without a high-pressure control circuit.
Figure 3:
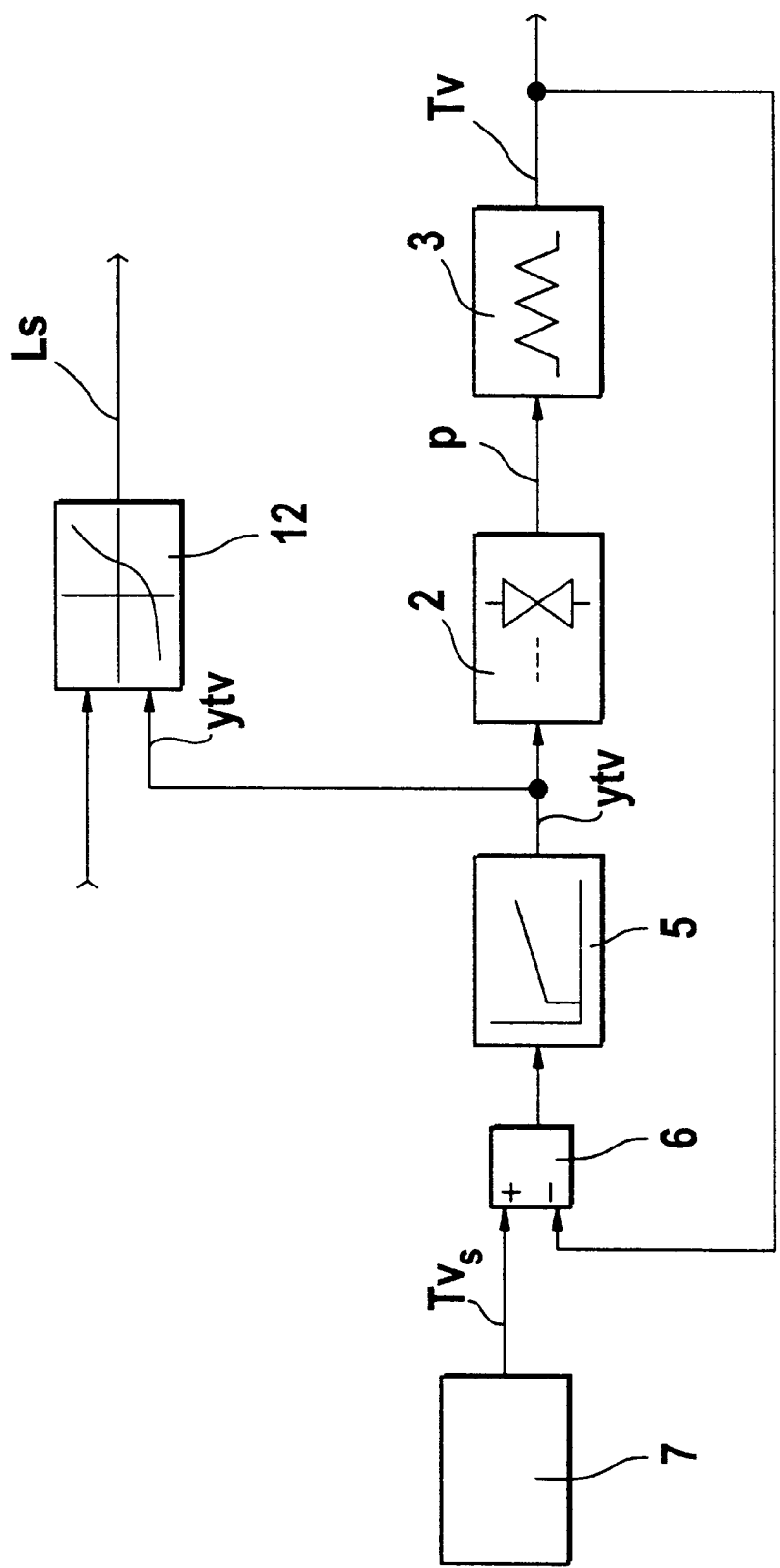
FIG. 3 is a block diagram of a control device corresponding to FIG. 2, but without an intake pressure control circuit.

The control devices shown in FIGS. 1 to 3 for a refrigerant circuit are especially suitable for controlling, besides others, CO2 air conditioners in motor vehicles, with the three examples shown differing by the presence or absence of a high-pressure control circuit and a compressor intake pressure control circuit.

The control device in FIG. 1 incorporates a low-pressure-side control part which consists of a compressor intake pressure control circuit and an evaporator temperature control circuit superimposed on the latter. The intake pressure control circuit incorporates an intake pressure regulator 1. The actuating signal ys from the intake pressure regulator 1 controls a compressor valve of a controllable compressor 2. On the refrigerant outlet side of an evaporator 3 connected upstream of the compressor 2 (as regards refrigerant flow direction), a certain intake pressure actual value ps occurs under the influence of the compressor 2. The actual intake pressure value ps acts on the function of evaporator 3 and is feedback to an intake pressure control deviation determination unit 4 located upstream of the intake pressure control 1, to which unit 4 on the other hand a desired intake pressure setpoint $ps_s$ is supplied. The goal is to set the compressor intake pressure ps to a corresponding setpoint $ps_s$, which is established depending on the evaporator temperature Tv desired on the user side.

In order to achieve the desired evaporator temperature Tv, even when disturbing physical effects occur, the evaporator temperature control circuit is superimposed on the intake pressure control circuit. The evaporator temperature control circuit incorporates an evaporator temperature regulator 5. The evaporator temperature regulator 5 delivers the intake pressure setpoint $ps_s$ as its actuating signal. Connected upstream from the regulator 5 is a unit 6 for determining the evaporator temperature control deviation. The unit 6 receives the evaporator temperature actual value Tv as feedback and an evaporator temperature setpoint $Tv_s$ that can be set on a user-operable operating element 7, such as an adjustment knob. The determination of the intake pressure setpoint ps is based on a (for example) linearly rising characteristic curve for the intake pressure setpoint $ps_s$ as a function of evaporator temperature setpoint $Tv_s$.

On the high-pressure side, the control device has a high-pressure control circuit with a high pressure control 8 whose actuating signal yhs controls a controllable expansion valve 9. A unit 10 for determining the high-pressure control deviation is connected upstream of the high-pressure control 8. Supplied to the unit 10 is first the high-pressure actual value phs produced by expansion valve 9 as well as a high-pressure setpoint $phs_s$. This high-pressure setpoint $phs_s$ is delivered by a high-pressure setpoint calculating unit 11.

Characteristically, the high-pressure setpoint calculating unit 11 determines the high-pressure setpoint $phs_s$ not only as a function of the refrigerant temperature Tkm on the refrigerant outlet side of a cooling unit connected (as regards refrigerant flow direction) downstream from compressor 2, said unit being a condenser or gas cooler, but also as a function of the actuating signal ys from the intake pressure regulator 1 and hence as a function of an influential parameter of the low-pressure-side control part. Furthermore, the intake pressure actuating control signal ys is coupled into a fan control unit 12 as an additional low-pressure-side control component which serves to set a desired blower power of a fan blower for a cooling air stream guided over the cooling unit. The fan control unit 12 determines the blower power as a function of both the intake pressure actuating control signal ys as well as the temperature differential $\Delta T=Tkm-T1$ between the refrigerant temperature Tkm at the refrigerant outlet side of the cooling unit and the cooling air temperature T1 on the airflow inlet side of the cooling unit. The fan control unit output signal Ls is used to control the fan accordingly. This fan control is also performed advantageously in such fashion that the total energy requirement of the system remains minimal. Optionally, as indicated by the dashed lines in FIG. 1, provision is made such that the low-pressure-side intake pressure actuating control signal ys is supplied through a corresponding coupling line branch 13 to a control unit for a controllable circulating air flap in order to set the latter as a function thereof, for example to close the circulating air flap when the intake pressure actuating control signal ys is in a range that corresponds to a maximum high-pressure phs range.

By coupling the intake pressure actuating control signal ys, the high-pressure-side control part is advantageously coupled to the low-pressure-side control part. It turns out that as a result, a highly satisfactory control of CO2 air conditioners in particular is possible, in which the high-pressure phs set by the control and the control of the gas cooler or condenser, in other words of its cooling air blower, are adapted to the current cooling power of the system. Especially in the range of low cooling power, in which conventional controls of CO2 air conditioners do not always operate in a manner that is optimum as far as energy consumption is concerned, an energy saving as well as reliable system operation with stable control is achieved as a result of decoupling of the high-pressure-side and low-pressure-side control parts according to the invention. This improves the overall efficiency of the air conditioner.

The setpoint ys from intake pressure control 1 forms the basis of the regulating circuit and is interpreted as a measure of the current required cooling power, from which the high-pressure setpoint $phs_s$ and the actuating signal Ls are derived to control the fan of the gas cooler. In particular, for the dependence of the fan actuating signal Ls, a curve can be selected approximately according to the indicated insert of fan control unit 12 rising with an increasing intake pressure actuating control signal ys and hence with an increasing cooling power demand. The dependence upon this temperature differential $\Delta T$ can be taken into account by a multiplication factor normalized to values between 0 and 1, said factor being set to zero below a lower threshold value of the temperature differential and set to 1 above an upper threshold value, and having a rising curve between the two threshold values. The dependence of high-pressure setpoint $phs_s$ upon the intake pressure control setpoint ys can qualitatively have approximately the rising curve shown in the insert of the high-pressure setpoint calculating unit 11 with increasing intake pressure actuating control signal ys. The dependence of the high-pressure setpoint $phs_s$ on the above refrigerant temperature Tkm can be expressed in the form of an additive correction value that increases with rising refrigerant temperature Tkm.

FIG. 2 shows a control device that corresponds to that in FIG. 1 with the exception that no high-pressure control circuit is provided. Besides that, the control components used and the relevant process parameters agree, so reference symbols that are the same in this respect are used and reference can be made to the explanation of FIG. 1. This control device is suitable especially for air conditioners in which the expansion element is provided not by a controllable expansion valve but by a single-stage or multistage switchable fixed throttle arrangement. The coupling of the high-pressure-side and low-pressure-side control parts in this case involves the coupling of the low-pressure-side intake pressure actuating control signal ys to the high-pressure-side fan control unit 12 to control the fan blower of the gas cooler or condenser. In this way, this controllable system component on the high-pressure side can be adjusted in terms of its delivered power to the current cooling power demand of the system, as derived from the intake pressure actuating control signal ys. Reference can be made to what was said in connection with FIG. 1 regarding the advantages of coupling the high-pressure-side control part to the low-pressure-side control part.

FIG. 3 shows a control device that has been further simplified relative to FIG. 2 by the fact that there is no intake pressure control circuit on the low-pressure side. Otherwise, this control device contains the same components and process parameters as the control device in FIG. 2, so that the same reference numbers will be used in this respect and reference can be made in their description with respect to FIG. 2 and FIG. 1. In the embodiment of FIG. 3, the evaporator temperature control 5 delivers an actuating signal ytv that functionally takes the place of the intake pressure actuating control signal ys of the device in FIG. 2 in that it firstly serves as an actuating signal for the compressor 2 and secondly is coupled into the high-pressure-side control part, especially into the fan control unit 12 for controlling the fan blower of the gas cooler or condenser. The intake pressure p in this case does not constitute a directly controlled process parameter, but only one controlled indirectly by the evaporator temperature control. Even for this example of the coupling of the high-pressure-side control part to the low-pressure-side control part, the advantages recited in connection with the devices in FIGS. 1 and 2 largely apply.

While in the examples shown the coupling between the low-pressure-side and high-pressure-side control parts is in the form of a single influential parameter coupled from the low-pressure-side to the high-pressure-side control part, other types of coupling are also possible. Thus, the regulating part on the high-pressure side can be coupled by a plurality of influential parameters coupled from the low-pressure-side control part to the latter. Alternatively or in addition to coupling low-pressure-side influential parameters into the high-pressure-side control part, conversely one or more high-pressure-side influential control parameters can be coupled into the low-pressure-side control part, depending on the need and the application. In any case, this can be accomplished in each case such that an advantageous adjustment of the two control parts to one another or to the required cooling power of the system is accomplished.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for a refrigerant circuit of an air conditioner, the refrigerant circuit being divided by a compressor and an expansion element into a high-pressure side and a low-pressure side, comprising:
a control part on the high-pressure side controlling one or more controllable high-pressure-side air conditioner components;
a control part on the low-pressure side controlling one or more controllable low-pressure-side air conditioner components;
wherein the two control parts are coupled with one another, at least one influential parameter of one control part forming a coupling parameter coupled into the other control part as an effective influential parameter in said other control part.

2. The control device according to claim 1, wherein said at least one influential parameter is formed by a regulating variable of a low-pressure-side compressor intake pressure control or a regulating variable of a low-pressure-side evaporator temperature control, said regulating variable being coupled into the high-pressure-side control part.

3. The control device according to claim 1, wherein said at least one influential parameter is a low-pressure-side influential parameter coupled into the high-pressure-side control part as an influential parameter for at least one of adjusting a setpoint $phs_s$ for a high-pressure control and adjusting an air blower power for a refrigerant cooling unit coupled downstream from the compressor in the refrigerant flow.

4. The control device according to claim 2, wherein said at least one influential parameter is a low-pressure-side influential parameter coupled into the high-pressure-side control part as an influential parameter for at least one of adjusting a setpoint $phs_s$ for a high-pressure control and adjusting an air blower power for a refrigerant cooling unit coupled downstream from the compressor in the refrigerant flow.

5. The control device according to claim 1, wherein the coupling parameter coupled into the other control part as an effective influential parameter is provided in order to calculate a set point for a corresponding parameter of said other control point as a function of said influential parameter and as a function of a parameter of said other control point.

* * * * *